United States Patent
Djukic et al.

(10) Patent No.: US 11,153,229 B2
(45) Date of Patent: Oct. 19, 2021

(54) AUTONOMIC RESOURCE PARTITIONS FOR ADAPTIVE NETWORKS

(71) Applicant: Ciena Corporation, Hanover, MD (US)

(72) Inventors: Petar Djukic, Nepean (CA); Todd Morris, Stittsville (CA); Emil Janulewicz, Nepean (CA); David Jordan Krauss, Centreville, VA (US); Kaniz Mahdi, Carrollton, TX (US); Paul Littlewood, Johns Creek, GA (US)

(73) Assignee: Ciena Corporation, Hanover, MD (US)

( * ) Notice: Subject to any disclaimer, the term of this patent is extended or adjusted under 35 U.S.C. 154(b) by 56 days.

(21) Appl. No.: 16/251,394

(22) Filed: Jan. 18, 2019

(65) Prior Publication Data

US 2019/0230046 A1   Jul. 25, 2019

Related U.S. Application Data

(60) Provisional application No. 62/619,362, filed on Jan. 19, 2018.

(51) Int. Cl.
*H04L 12/911* (2013.01)
*H04L 12/24* (2006.01)
(Continued)

(52) U.S. Cl.
CPC .......... *H04L 47/788* (2013.01); *G06F 9/5077* (2013.01); *G06N 3/08* (2013.01);
(Continued)

(58) Field of Classification Search
CPC ..... H04L 47/788; H04L 47/76; H04L 47/781; H04L 47/822; H04L 47/805;
(Continued)

(56) References Cited

U.S. PATENT DOCUMENTS 9,805,345 B1 * 10/2017 Dailianas ............ G06Q 20/102
9,838,271 B2   12/2017 Djukic et al.
(Continued)

OTHER PUBLICATIONS

David Silver et al., Mastering the Game of Go without Human Knowledge, DeepMind, 5 New Street Square, London EC4A 3TW, Oct. 18, 2017, pp. 1-42.
(Continued)

*Primary Examiner* — Jimmy H Tran
(74) *Attorney, Agent, or Firm* — Clements Bernard Baratta; Lawrence A. Baratta, Jr.; Christopher L. Bernard

(57) ABSTRACT

System and methods for autonomous resource partitioning in a network include a resource controller configured to provision resources which are any of virtual resources and physical resources in one or more layers in the network and monitor availability of the resources in the network; a resource manager configured to determine the any of virtual resources and physical resources as required for Quality of Service (QoS) in the network; a resource broker configured to advertise and assign resource requests to corresponding resources; and a partition manager configured to track the utilization of the resources provided by the one or more layers and to adjust resource usage of the resources in negotiation with the resource broker to minimize a cost of implementation.

19 Claims, 14 Drawing Sheets

(51) Int. Cl.
  *G06N 3/08* (2006.01)
  *G06F 9/50* (2006.01)
  *H04L 12/927* (2013.01)
  *H04L 12/917* (2013.01)

(52) U.S. Cl.
  CPC ...... *H04L 41/5003* (2013.01); *H04L 41/5025* (2013.01); *H04L 47/76* (2013.01); *H04L 47/781* (2013.01); *H04L 47/805* (2013.01); *H04L 47/822* (2013.01)

(58) Field of Classification Search
  CPC ............. H04L 41/5025; H04L 41/5003; H04L 41/5009; G06F 9/5077; G06N 3/08; G06N 3/006; G06N 3/084; G06N 3/04
  See application file for complete search history.

(56) References Cited

U.S. PATENT DOCUMENTS

| | | | |
|---|---|---|---|
| 9,871,582 B2 | 1/2018 | Djukic et al. | |
| 9,924,392 B2 | 3/2018 | Côté et al. | |
| 10,217,053 B2* | 2/2019 | Bordawekar | G06N 7/005 |
| 10,417,556 B1* | 9/2019 | Fairbank | G06N 3/006 |
| 10,511,724 B2* | 12/2019 | Shaw | H04M 15/852 |
| 10,779,292 B2* | 9/2020 | Comsa | H04W 72/0446 |
| 2003/0037089 A1* | 2/2003 | Cota-Robles | G06F 9/45558 718/1 |
| 2003/0236745 A1* | 12/2003 | Hartsell | G06Q 20/102 705/40 |
| 2007/0067476 A1* | 3/2007 | Karhinen | H04L 41/5003 709/230 |
| 2013/0166750 A1* | 6/2013 | Moon | H04L 5/0007 709/226 |
| 2014/0086177 A1* | 3/2014 | Adjakple | H04L 67/10 370/329 |
| 2016/0212623 A1 | 7/2016 | Côté et al. | |
| 2016/0330083 A1 | 11/2016 | Djukic et al. | |
| 2016/0353268 A1* | 12/2016 | Senarath | H04W 4/24 |
| 2017/0054595 A1* | 2/2017 | Zhang | H04L 41/5048 |
| 2017/0270450 A1* | 9/2017 | Binotto | H04L 43/0876 |
| 2018/0041905 A1* | 2/2018 | Ashrafi | H04W 48/18 |
| 2018/0077023 A1* | 3/2018 | Zhang | H04W 16/04 |
| 2018/0176886 A1* | 6/2018 | Kodaypak | H04W 76/10 |
| 2018/0220276 A1* | 8/2018 | Senarath | H04W 4/24 |
| 2018/0220358 A1* | 8/2018 | Reith | H04W 4/24 |
| 2018/0241843 A1* | 8/2018 | Bardhan | H04L 67/322 |
| 2018/0247191 A1* | 8/2018 | Katz | G06Q 20/12 |
| 2018/0248771 A1 | 8/2018 | Côté et al. | |
| 2018/0248905 A1 | 8/2018 | Côté et al. | |
| 2018/0260692 A1* | 9/2018 | Nagaraja | G06N 3/08 |
| 2018/0270073 A1* | 9/2018 | Senarath | H04L 41/0893 |
| 2018/0317133 A1* | 11/2018 | Sciancalepore | H04W 28/24 |
| 2018/0351652 A1* | 12/2018 | Ashrafi | H04L 41/08 |
| 2018/0376338 A1* | 12/2018 | Ashrafi | H04L 41/0806 |
| 2019/0021010 A1* | 1/2019 | Senarath | H04W 16/10 |
| 2019/0098039 A1* | 3/2019 | Gates | G06N 3/0427 |
| 2019/0109768 A1* | 4/2019 | Senarath | H04L 41/0681 |
| 2019/0138948 A1* | 5/2019 | Janulewicz | H04L 45/125 |
| 2019/0147234 A1* | 5/2019 | Kicanaoglu | G06K 9/4628 382/218 |
| 2019/0158676 A1* | 5/2019 | Shaw | H04M 15/8016 |
| 2019/0273635 A1* | 9/2019 | McNamee | H04W 4/24 |
| 2019/0327182 A1* | 10/2019 | Parikh | H04L 43/0811 |
| 2020/0007414 A1* | 1/2020 | Smith | H04L 67/10 |
| 2020/0050494 A1* | 2/2020 | Bartfai-Walcott | G06F 9/5083 |
| 2020/0195577 A1* | 6/2020 | Chung | H04L 45/24 |
| 2021/0076234 A1* | 3/2021 | Ashrafi | H04W 84/18 |

OTHER PUBLICATIONS

David Côté, Using Machine Learning in Communication Networks [Invited], Mar. 2018, pp. 1-9.
Pieter Abbeel et al., Apprenticeship Learning via Inverse Reinforcement Learning, Computer Science Department, Stanford University, Stanford, CA 94305, USA, Jul. 4, 2004, pp. 1-8.
Light Reading, Networking the Communications Industry, Nokia Intros Predictive Care for Fixed Networks, Oct. 17, 2017, pp. 1-4.
Light Reading, AT&T Launches Open Source AI Platform, Oct. 30, 2017, pp. 1-4.
Volodymyr Mnih et al., Playing Atari with Deep Reinforcement Learning, DeepMind Technologies, pp. 1-9.
Volodymyr Mnih et al., Human-level control through deep reinforcement learning, vol. 518, Research Letter, doi:10.1038/nature14236, Feb. 26, 2015, pp. 1-13.

* cited by examiner

AUTONOMIC RESOURCE PARTITIONS FOR ADAPTIVE NETWORKS

CROSS-REFERENCE TO RELATED APPLICATION(S)

The present patent/application claims priority to U.S. Provisional Patent Application No. 62/619,362, filed on Jan. 19, 2018, and entitled "Autonomous resource partitions for network slices," the contents of which are incorporated by reference herein.

FIELD OF THE DISCLOSURE

The present disclosure generally relates to networking systems and methods. More particularly, the present disclosure relates to autonomous resource partitions for adaptive networks, such as 5G network slices.

BACKGROUND OF THE DISCLOSURE

Three key transformation trends are currently at play that shed some light on the future network trajectory being shaped by a confluence of 5G wireless and Software Defined Networking (SDN), namely access evolution, cloud pivot, and pervasive automation. For access evolution, access unification has been talked about for decades. However, wireline and wireless networks have evolved independently to date. It is only now that lines between wireline and wireless access are finally starting to blur, such as due to network function disaggregation and re-composition made plausible with SDN/Network Function Virtualization (NFV), and more importantly, extreme radio characteristics expected with 5G, which help to overcome key inhibitors for broadband convergence, bandwidth, reachability, and performance.

For cloud pivot, centralization of (compute, storage and network) resources with cloud computing has been on the rise since the early 2000s, a market currently dominated by the web providers, as the telecom providers transform their networks with SDN/NFV, in what appears to be a race for content. Massive application of machine intelligence in all facets of life, however, indicates an imminent pull toward distributed computing; which brings up the final and most impactful trend taking shape at present, and that is pervasive automation. For pervasive automation, process automation has been in place for decades, for example, use of Programmable Logic Controllers (PLCs) for software-driven electro-mechanical process automation in industrial environments, Operation Support System (OSS)/Business Support System (BSS) workflow automation for telecom and enterprise, and most recently Continuous Integration and Continuous Delivery (CI/CD) for software engineering, and DevOps toolchain. However, the recent explosion of connected devices, and technology advances in robotics and deep learning (specifically, artificial neural-nets) has elevated plausible levels of automation to the nth degree, as manifested with numerous 'self-driving' technologies being tested (e.g., autonomous cars and drones). Future networks face unprecedented growth in demand for data ingestion and control, and are latency constrained, high volume exchange from such autonomous devices while maintaining strict Service Layer Agreements (SLAs) for traditional real-time applications (e.g., voice and video). Optimal distribution of intelligence has emerged as a key imperative for future networks expected to serve a multitude of disparate autonomic systems, some of which may comprise of swarms of Internet of Things (IoT) devices which may, in turn, contribute localized autonomic control to their respective systems.

Current techniques of designing, deploying, and operating networks are seriously challenged by these trends. There is a need for a logical convergence of current telco, cloud, and IoT systems toward 'Hierarchical Networks,' in which disparate control systems are dynamically stitched together with east-west and north-south interfaces for distribution of intelligence across the time and space continuum; each representing their respective jurisdictions with the right levels of abstraction, and federated against global policies pertaining to the service(s) being delivered.

Existing approaches essentially include a network controller such as a Manage, Control, and Plan (MCP) system from Ciena Corporation and the OpenDaylight platform, which are a way to create a higher layer complex actions Application Programming Interfaces (APIs) to be applied to the network. Another set of solutions are NFV Management and Orchestration (MANO) orchestrators, which may provide an instantiation of layered resources through templating of what the layers look like, and fixed, predetermined policies on template activation. These current approaches are not going to scale, as every dynamic composition of a layer in the architecture requires hand-crafted policies and templates to match them. What is required is an automation approach that can work with any dynamic composition, after it self-learns how to divide its resources.

BRIEF SUMMARY OF THE DISCLOSURE

In an embodiment, a system for autonomic resource partitioning in a network includes a resource controller configured to provision resources which are any of virtual resources and physical resources in one or more layers in the network and monitor availability of the resources in the network; a resource manager configured to determine the any of virtual resources and physical resources as required for Quality of Service (QoS) in the network; a resource broker configured to advertise and assign resource requests to corresponding resources; and a partition manager configured to track the utilization of the resources provided by the one or more layers and to adjust resource usage of the resources in negotiation with the resource broker to minimize a cost of implementation. One or more of the partition manager and the resource broker can utilize reinforcement learning in the negotiation, wherein the partition manager can receive resource partition state information and provide resource adjustment information to the resource broker, and wherein the resource broker can provide resource costs to the partition manager and commands for resource adjustments to the resource controller. The one or more of the partition manager and the resource broker can utilize deep-Q network (DQN) reinforcement learning.

The resources can be a combination of compute, storage, wired connectivity resources and wireless connectivity resources. The virtual resources can include dynamic compositions of chained Virtual Network Functions (VNFs), and wherein the physical resources can include any of hard slices and soft slices of the network. The resource broker can utilize pricing on resource usage to ensure the partition manager gives up corresponding resources when they are not needed in a partition managed by the partition manager. The partition manager can be configured to monitor Quality of Service (QoS) in the network, determine required resources in the network to meet Service Layer Agreements (SLAs) and to maximize long-term rewards, one or more of request and release corresponding resources in the network to maximize the long-term rewards, and determine costs of the resources and correlate the costs to the long-term rewards. The long-term rewards can be determined by calculating long-term network cost which includes a cost of resources plus a cost of not meeting Service Layer Agreements (SLAs). The resource broker can be configured to monitor resource usage in the network, determine prices of resources in the network based on the resource usage and to maximize long-term rewards, receive a request for associated resources and grant the request if the resources are available and block the resources if unavailable, and determine costs of the resources and correlate the costs to the long-term rewards. The long-term rewards can be calculated as revenue minus cost, namely R(T)=Revenue(T)− Cost(T) where R(T) is the reward for each time slot T.

In another embodiment, a method for autonomous resource partitioning in a network includes provisioning resources which are any of virtual resources and physical resources in one or more layers in the network and monitoring availability of the resources in the network; determining the any of virtual resources and physical resources as required for Quality of Service (QoS) in the network; advertising and assigning resource requests to corresponding resources; and tracking the utilization of the resources provided by the one or more layers and to adjust resource usage of the resources based on a negotiation to minimize a cost of implementation. The provisioning and the monitoring can be performed by a resource controller, the determining can be performed by a resource manager, the advertising and the assigning can be performed by a resource broker, and the tracking can be performed by a partition manager. One or more of the partition manager and the resource broker can utilize reinforcement learning in the negotiation, wherein the partition manager can receive resource partition state information and provide resource adjustment information to the resource broker, and wherein the resource broker can provide resource costs to the partition manager and commands for resource adjustments to the resource controller.

The resources can be a combination of compute, storage, wired connectivity resources and wireless connectivity resources. The virtual resources can include dynamic compositions of Virtual Network Functions (VNFs), and wherein the physical resources can include any of hard slices and soft slices of the network. The method can further include monitoring Quality of Service (QoS) in the network; determining required resources in the network to meet Service Layer Agreements (SLAs) and to maximize long-term rewards; one or more of requesting and releasing corresponding resources in the network to maximize the long-term rewards; and determining costs of the resources and correlate the costs to the long-term rewards. The method can further include monitoring resource usage in the network; determining prices of resources in the network based on the resource usage and to maximize long-term rewards; receiving a request for associated resources and grant the request if the resources are available and block the resources if unavailable; and determining costs of the resources and correlate the costs to the long-term rewards.

In a further embodiment, a reinforcement learning system for autonomous resource partitioning in a network includes a resource controller configured to provision resources which are any of virtual resources and physical resources in one or more layers in the network and monitor availability of the resources in the network; a resource broker configured to advertise and assign resource requests to corresponding resources; and a partition manager configured to track the utilization of the resources provided by the one or more layers and to adjust resource usage of the resources in negotiation with the resource broker to minimize a cost of implementation, wherein one or more of the partition manager and the resource broker utilize reinforcement learning in the negotiation, wherein the partition manager receives resource partition state information and provides resource adjustment information to the resource broker, and wherein the resource broker provides resource costs to the partition manager and commands for resource adjustments to the resource controller. The one or more of the partition manager and the resource broker can utilize deep-Q network (DQN) reinforcement learning. The resources can be a combination of compute, storage, wired connectivity resources and wireless connectivity resources.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Figure 1:
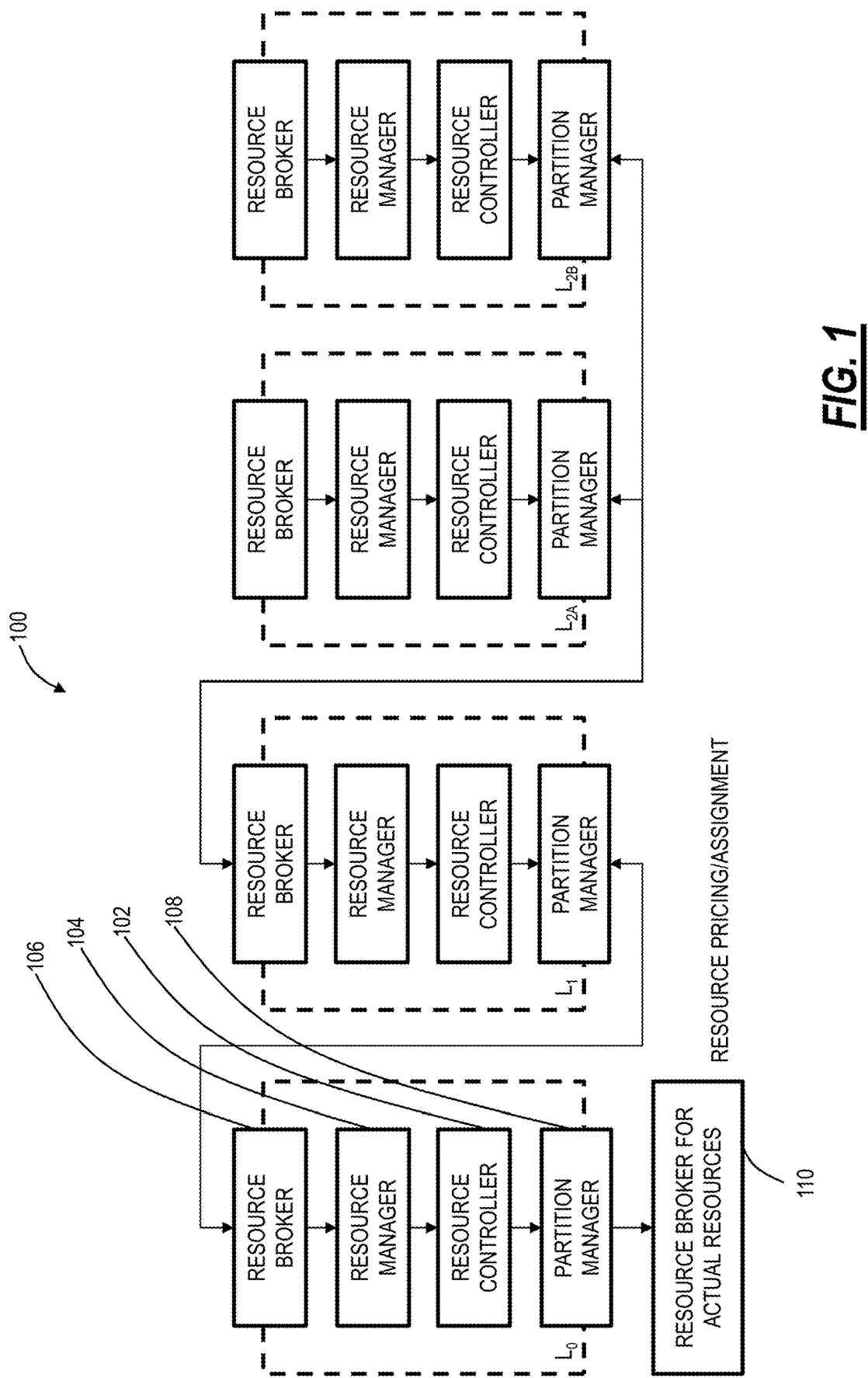
FIG. 1 is a block diagram of recursive relationships in the management plane.

In various embodiments, the present disclosure relates to systems and methods for autonomous resource partitions for adaptive networks, such as 5G network slices. The systems and methods automate the process by which link, switch, spectrum (wireless and optical), storage, compute, and other controllable (tangible) resources in the network are assigned to resource partitions, used to create Virtual Mobile Network Service Providers (vMNSPs) on a shared infrastructure. The systems and methods include a set of components, protocols and reinforcement learning algorithms based on deep Q-networks (DQN) that automate the process of assigning resources (actual or virtual) to resource partitions, which are the building blocks used to layer internal functionality of a vMNSP through dynamic compositions of virtual network functions. Deep Q-networks are described in Mnih, Volodymyr et al. "Playing Atari with deep reinforcement learning." arXiv preprint arXiv:1312.5602 (2013) and Mnih, Volodymyr, et al. "Human-level control through deep reinforcement learning." Nature 518.7540 (2015): 529-533. Specifically, a deep Q-network (DQN) is able to combine reinforcement learning with a class of artificial neural network known as deep neural networks.

The systems and methods utilize DQN-based reinforcement learning to manage the resources in the layered virtual architecture and a protocol to communicate between the management or control components in the layers. A use case is in managing actual resources in the first layer of the architecture. Another aspect is that the layers span wired and wireless network domains. The DQN aspect in addition to having a recursive management plane architecture is key to resolving the limits of known solutions. DQN is a modern implementation of reinforcement learning based on a state approximation of the underlying observed system using Deep Neural Networks (DNN). The use of a DNN allows the creation of one general DQN structure, which can learn to control virtual network layers of any kind of component and with any structure.

An objective of the systems and methods includes functional stacks of disparate systems dynamically chained together to serve a particular user segment, just as Internet Protocol (IP) services are stitched together in an IP service chain. With this approach, the underlying service delivery mechanism s are abstracted to a level that the network becomes invisible to the user/operator.

The following describes the underlying technologies and the challenges ahead. When one looks at what is being promised with 5G, one of the key underpinnings of future networks, the user scope seems rather complex—nothing close to the simple patterns of today structured around human communications and entertainment. 5G is expected to serve three different extremes: (1) Massive Broadband, (2) Massive Volumes, and (3) Massive Performance. An important observation here is that Traditional Architectures employing straight virtualization of monolith network functions, for statically preconfigured services, will not be effective due to a high degree of variance in service characteristics and dynamicity of scale expected with 5G.

Key to designing such systems is in preserving simplicity while enabling extreme flexibility. Thus, there is a need for a new design paradigm that enables Ultra-Lean Modular Systems. Slicing has been discussed, but what is actually needed is dynamic compositions, i.e., networks that are created on demand; with minimal network components optimally placed to match the needs for the service(s) that they provide; such compositions continuously adapt to external and internal change stimuli (exhibiting adaptable and adaptive behaviors, respectively).

The crux of mobile networks is pretty much the same since the inception of the mobile phone, all iterations addressing one key imperative through the progression of radio standards from 2G to 3G to 4G: a communication channel to connect two or more humans, established using a multitude of purpose-built mobility and security gateways bolted on a packet network originally designed for non-differentiated web browsing. This results in extra cost (in terms of resource consumption, as well as latency budget) and duplication of functionality as user packets traverse multiple functional stacks at different touch points on their path through the mobile system; not to mention complexity in configuring such systems, and operational inefficiencies resulting from layers and layers of features bolted on over time.

Current industry efforts around the separation of the control plane and the user plane functions with SDN/NFV to enable data plane programmability is an important first step. However, significant effort is needed to evolve current networks toward composability of lean systems that maximize extensibility with minimal redundancy and completely eliminate software and hardware dependencies.

Ideally, it should be possible to replace such monolith gateways with control applications that drive application specific control behaviors through a southbound API exerted on a common data plane fabric. Stitching a user-flow then becomes simply a matter of stitching various control applications with east-west and north-south interfaces.

Current networks are configured for traffic flows that follow a user-to-content (U2C) construct with the centralization of data in large data centers located in metro and rural areas, with provision for improved efficiency in content delivery through internet access points and cache locations placed closer to the points of content consumption. Although this is a perfectly sound model for content delivery with effective use of capacity over metro and long-distance backbones, and low latency between users and content processing locations, it is challenged by ultra-low latency control expected with 5G, and order of magnitude higher volumes of latency constrained data exchange expected with IoT; in terms of both nodal interconnection and computational positioning.

Central Office transformation toward data centers has started to take shape (through initiatives like CORD), paving the way for the evolution of Telco networks to distributed software programmable environments; although it helps to bring content and services closer to the user/operator for improved network efficiency, this level of distribution is not enough as deeper levels of distribution are deemed necessary to address these requirements. There is a need for a hierarchical system that distributes intelligence across a time and space continuum, with control loops staggered across the two extremes represented by the 'user-device' and the 'of content origination.'

This brings up the toughest challenge faced by the real-world implementation of hierarchical system, and that is the optimal distribution of intelligence. Autonomics in the context of automated network manaagement has been researched in academia with selective industry participation for over a decade now—a handful of industry initiatives have just recently started to study practical challenges that stand in the way of real-world implementations, but this area remains rife with open research questions, such as:

modeling of unprecedented traffic swarms expected of newly defined, or yet to be defined, autonomous processes (e.g., self-driving cars);

placement and federation of control loops for a robust control hierarchy;

seamless continuity of service(s) for mobility across distributed control systems;

data ownership and federation across multiple control jurisdictions;

dynamic creation, adaptation, and enforcement of security and policy across multiple jurisdictions;

dynamic topology predictions for optimal placement; and creation, control, and management of dynamic compositions with optimally placed network function and control components;

and so on and so forth.

Access, Cloud, and IoT market segments converging toward what is represented by a broad suite of technologies ranging from compute and intelligence capabilities residing on a mobile user device (e.g., vehicle, or handset); located in a home (e.g., home automation appliance); or an enterprise (e.g., local service network); or positioned in the network at a cell tower or a central office. As it results from the amalgamation of different market segments, this technology suite is currently being referred to by different names, as defined by the contributing market segment, e.g., Telco industry has landed on the term Multi-Access Edge, whereas Open Fog is used in IoT.

Several industry initiatives, currently underway, are exploring and/or developing different facets of this technology suite as driven by the specific needs of the originating market segment, such as:

ETSI MEC, for example, was initiated by the Wireless Service Providers as a platform for RAN Applications and has now evolved with the support of SDN/NFV for Multi-Access Edge.

Open Fog, originated from the IoT industry, has evolved into a reference framework that distributes computing, storage, control, and networking functions closer to the users along a cloud-to-thing continuum.

CORD started out as a platform for Central Office transformation and is now aiming at Multi-Access Edge.

And, there are several others which have just recently emerged, e.g., OEC/LEL, ONAP, xRAN, TIP, to name a few.

There is a need for different reference implementations suited to match their respective market segments. However, interoperability across disparate implementations is paramount to the ubiquitous provision of services across a time and space continuum that transcends multiple jurisdictions (e.g., multiple service providers serving different segments of a particular service chain). One could try and build an all-encompassing standard that unifies potential domains and jurisdictions involved, but previous attempts to solve similar problems with an umbrella standard have not proved to be effective. However, it would be advantageous for a common architecture pattern that stitches disparate reference implementations with open API, information models, and abstractions building on common core principles, for example, SDN Architecture set forth by ONF.

Again, the systems and methods can automate the process by which link, switch, spectrum (wireless and optical), storage, compute, and other tangible resources in the network are assigned to resources partitions, used to create Virtual Mobile Network Service Providers (vMNSPs) on a shared infrastructure. Today's technology limits the number of vMNSPs sharing a common infrastructure to just a few. 3GPP and others (ETSI, ONAP) are improving the bottlenecks in current standards, which are limiting the number and variety of vMNSPs possible. From a commercial point of view, the expectation is that the number of vMNSP in 5G will explode to enable new revenue streams for traditional mobile service providers. The variety of vMNSP is also expected to explode as the expectation is that each vMNSP may specialize in a specific type of mobile network: voice, broadband, IoT, vehicular networks, etc. Having many vMNSPs sharing 5G infrastructure is going to make the network too complicated to be managed in a manual fashion or semi-automated fashion. In particular, the virtualization of various network components includes decomposing current network functionality into smaller into building blocks and then dynamically reconstituting network functionality inside resource partitions and then running this dynamic composition over a shared infrastructure consisting of optical links, hardware switches, compute, store and radio-enabled elements.

To make automation work in an environment where there are many varieties of somewhat similar things, re-use of control components is a necessity. It can be observed that in fact, while the network functionality may be in general complex, it can be composed dynamically with building blocks of layered virtual functionality. Each layer in the dynamic composition consumes the resources of the layer below it and provides resources to a layer above. So, there is a recursive pattern at play, which can be exploited to reduce the complexity required to control the network.

FIG. 1 is a block diagram of recursive relationships in a management plane 100. For the purposes of bounding functionality to a reasonable number of reasonably sized blocks, the following components that exist in each layer of a dynamic composition are distinguished. Note, many functional compositions of the components may be possible for implementing the systems and methods, and the examples provided herein are for illustration only.

In particular, the four components shown in FIG. 1 includes a resource controller 102, a resource manager 104, a resource broker 106, and a partition manager 108. Each of these devices can be one or more processing devices such as described in FIG. 14 including combining the components in the same processing device, utilizing different processing devices, via virtualization (e.g., Virtual Machines (VM), software containers, etc.) in one or more processing devices, and the like. The resource controller 102 provisions resources 110 and keeps track of their availability. Today this component would be a network management system such as an Element Management System (EMS), Network Management System (NMS), or a controller such as OpenDaylight. Note that other algorithms optimized from the knowledge of the resources 110 in its layer, this controller 102 has very little intelligence, mostly it does bookkeeping.

The resource manager 104 creates virtual resources satisfying the Quality of Service (QoS) required in a layer by using resources 110 provided by the layer below it and requested through the partition managers 108 in its layer. Virtual resources may be virtual network connections, virtual CPUs, virtual RAM, Kubernetes nodes, disk partitions. The resource manager may create these virtual resources by commissioning; and provisioning actual resources, or by releasing resources used by the system. A layer may have more than one resource manager 104 if it has more than one resource partition 112 (FIG. 2) (real or actual). Today this component may be an NFV MANO orchestrator. Note that what is described goes beyond simple provisioning of NFVs and also considers Quality of Service (QoS) tracking and matching of resources to where QoS is required.

The resource broker 106 advertises and assigns or blocks resource requests 110 to the virtual resources created through dynamic composition and the resource manager 104 to the resource partitions in the layer above it. The partition manager 108 tracks the resources used by the partition and their utilization 110 provided by the layer below and adjusts resource usage in negotiation with the resource broker to minimize the cost of implementing the layer.

Figure 2:
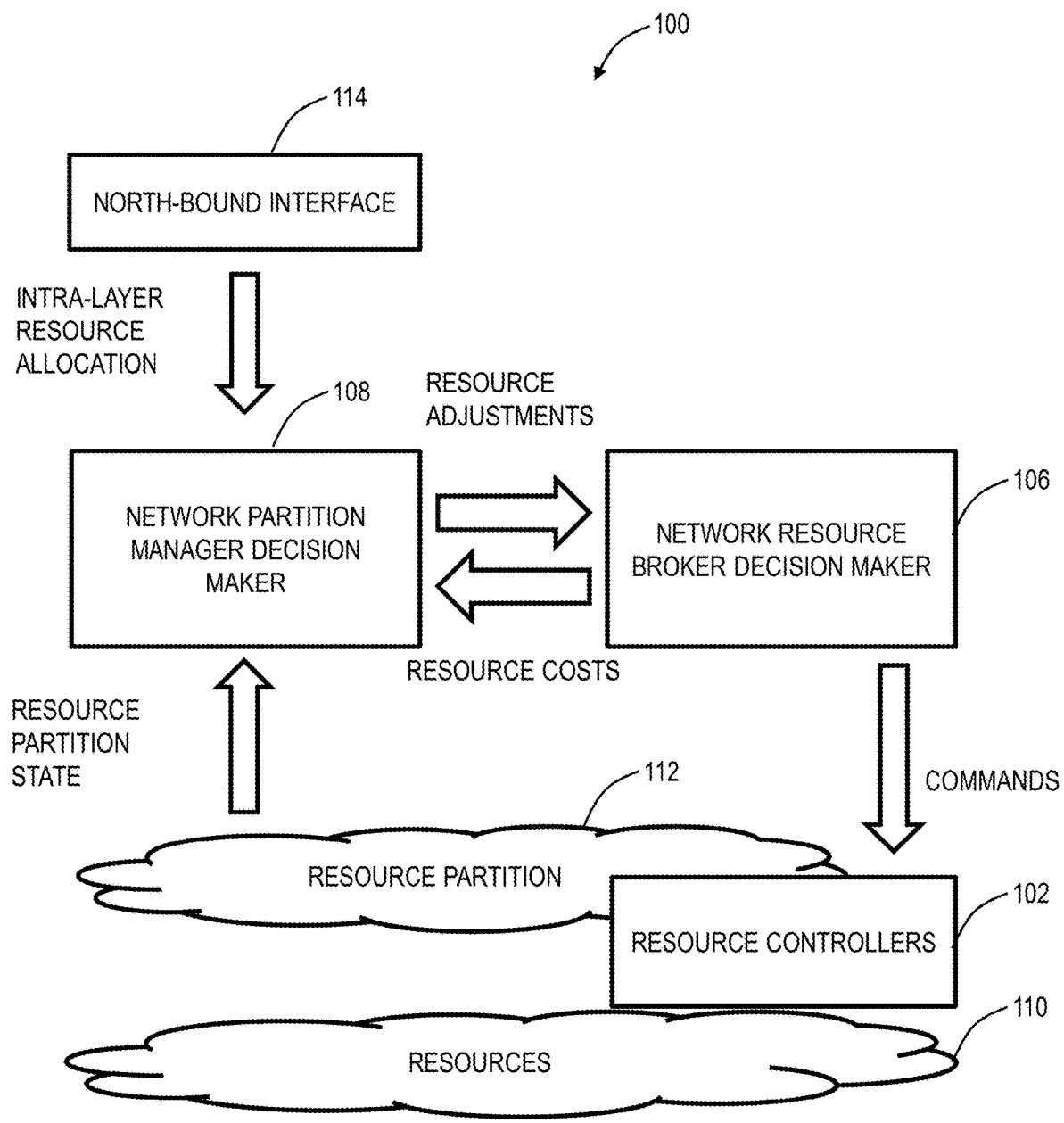
FIG. 2 is a block diagram of the relationship between reinforcement learning components.

FIG. 2 is a block diagram of the relationship between reinforcement learning components in the management plane 100. The systems and methods include automation of the resource broker 106 and the partition manager 108, and the systems and methods include a protocol to negotiate resources 110 and prices. In particular, the resource broker 106 can use pricing or a similar mechanism (i.e., anything that assigns some cost or another metric) such as time limits on resource usage to ensure that partition managers 108 give up resources when they are not needed in the partition. The costs may be assigned to links between the resources to simplify advertising of prices (see IETF, "ALTO-based Broker-assisted Multi-domain Orchestration," draft-lachos-rothenberg-alto-brokermdo-01, 2018.). Note the existence of two DQN-based learners (partition manager 108 and resource broker 108) in FIG. 2 and the interaction between them. Also, a North-Bound Interface (NBI) 114 can provide an interface to the partition manager 114 for intra-layer resource allocation.

The partition manager 108 is configured to receive and maintain resource 110 partition state from the resource partition 112 and to interact with the resource broker 106. The resource broker 106 is configured to provide commands to the resource controllers 102 based on the interactions with the resource broker 108. The interactions can include resource costs provided by the resource broker 106 to the partition manager 108 and resource adjustments provides by the partition manager 108 to the resource broker 106.

Resource Pools and Dynamic Dompositions

The concept of 5G network slicing is currently underexplained and often misunderstood. The concept revolves around a virtualized mobile network service provider (vMNSP). The vMNSP is an entity that instantiates an access restricted mobile network over a shared infrastructure. Each network may have its own set of QoS depending on the application and examples can include police, fire, military, industrial applications, tactile internet, the application provides (e.g., Uber, Facebook, Google, etc.), mobile operators, etc.

A vMNSP may have one or more virtual mobile resource partitions (vMNPs), suited for specific applications, e.g., an ultra-low-latency partition, a large bandwidth partition, etc. A vMNSP can be built using actual resource pools, dynamic compositions, and virtual resource pools. The actual resource pools can include hard or soft slices of infrastructure allocated to the vMNSP. The dynamic compositions include software-based network functionality implemented in the resource pool for dynamically composing virtual network functions required to have a mobile network functionality. The virtual resource pools can include dynamic compositions obtained in a layered fashion creating virtual resource pools, e.g., Layer 1: virtual machines and IP/Ethernet connectivity; Layer 2: vRouters and docker containers; Layer 3: vRAN, vCN, etc. For this example, the underlying base layer, L0, is physical hardware components such as compute server, storage components, radio transmit and receive components, antennas, fibers, spectrum, and hardware routers and switches.

Autonomous Resource Partitions

Resource partitions are the actual resources 110 provided to an actual resource pool and may include, without limitation, in the example of 5G network slices, radio access technologies and radio spectrum connecting User Equipment (UE) to a Radio Access Network (RAN), compute/storage resources for Virtualized Network Functions (VNF), network switches/router devices, fibers/amplifiers, and optical spectrum, and the like. The objective is an automated system which allows resource partitions to increase/decrease resources 110 of a particular type to meet the needs of internal traffic and to manage resources among the partitions to ensure they are used efficiently.

The systems and methods require the resource broker 106 to keep track of and assign resources to resource partitions and the partition manager 108 to manage resources in the partition while meeting SLAs for its traffic. The systems and methods can utilize Reinforcement Learning (RL) in resource partitions 112 to manage resources 110 to minimize costs or some other objective, Reinforcement Learning in resource brokers 106 to determine costs and assignment of resources for global resource efficiency, and costs on resources to ensure resource partitions 112 manage their resources efficiently.

Recursive Virtualized/Resources and Broker

Virtualized resources can be treated similarly to actual resources 110. At each layer, there is a virtual resource broker and at least one virtual resource partition manager. The virtual resource broker assigns resources to the virtual resource partition managers in the layer above it. The virtual resource managers optimize their virtual resource usage to decrease the overall usage in the resource partition. There can be multiple virtual resource partitions because the 5G control and data plane are segregated so they could be embedded in separate virtual partitions. A vNMSP may decide to have separate virtual networks for its large set of users. For example, a wireless service provider may partition its virtual network into public safety, and public mobile networks, each of those, in turn, may be partitioned into control and data plane networks.

Dynamic Compositions

Figure 3:
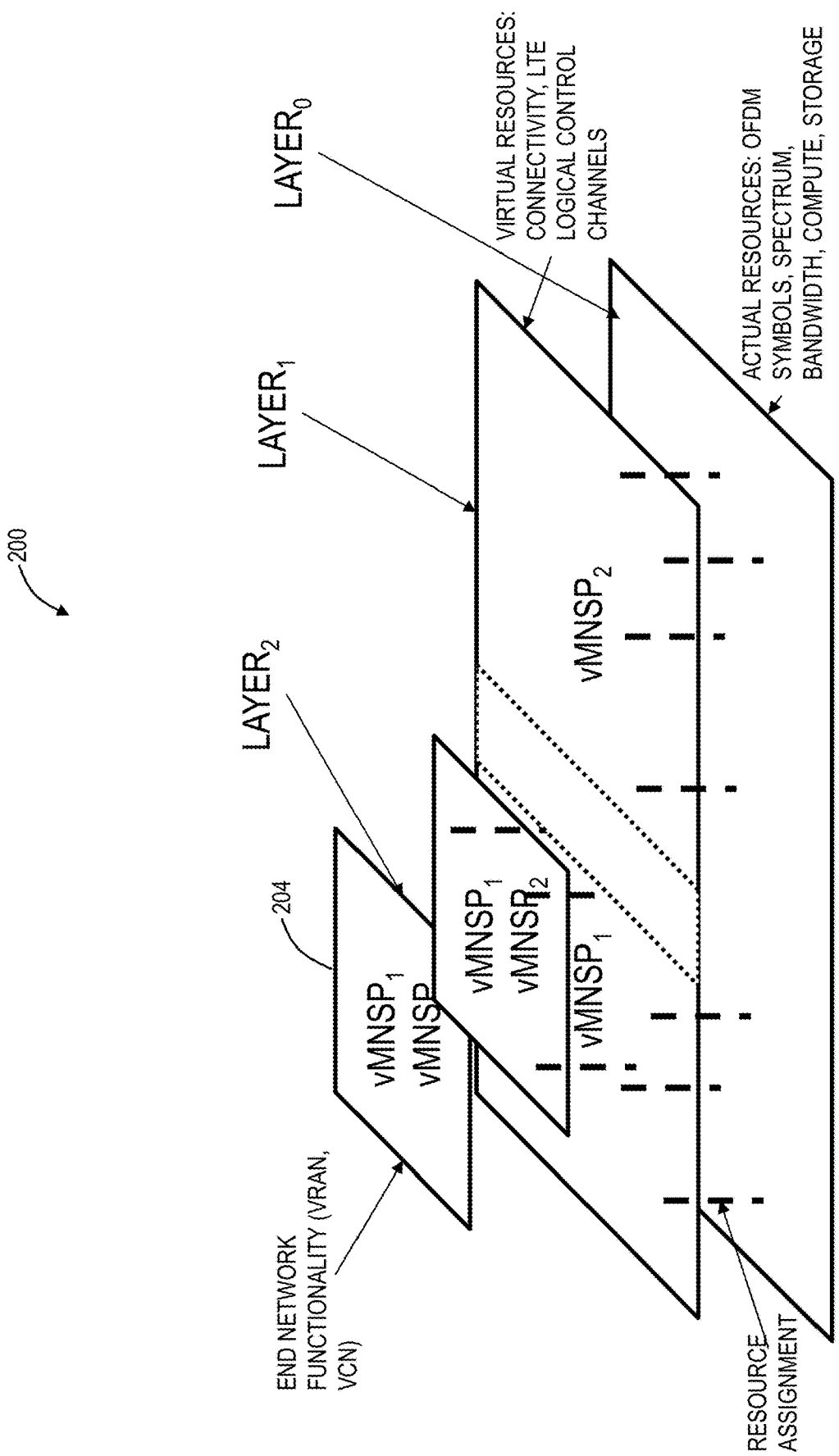
FIG. 3 is a logical diagram illustrating dynamic compositions in a network for Virtual Mobile Network Service Providers (vMNSPs) on a shared infrastructure.

Again, the dynamic compositions include software-based network functionality implemented in the resource pool for dynamically composing virtual network functions required to have mobile network functionality or the like. FIG. 3 is a logical diagram illustrating dynamic compositions in a network 200 for Virtual Mobile Network Service Providers (vMNSPs) 202 on a shared infrastructure. In this example, there are vMNSPs 202 labeled $vMNSP_1$ and $vMNSP_2$. For logical illustration, the dynamic compositions are illustrated in layers 204 (labeled as $LAYER_0$, $LAYER_1$, $LAYER_0$) with the bottom layer $LAYER_0$ including actual resources 110. Again, in the 5G example, actual resources 110 can include wireless symbols (e.g., Orthogonal Frequency-Division Multiplexing (OFDM)), optical and wireless spectrum, bandwidth, compute, storage, etc. Of note, the actual resources are implemented through physical or virtual network elements or devices. The systems and methods include layers above the actual resources 110, such as Layer 1, Layer 2, etc. in this example. That is, in this example, $LAYER_0$ is used to denote the actual resources 110 and their physical implementation. $LAYER_1$ CZcan denote virtual resources such as connectivity, Long Term Evolution (LTE) logical control channels, Time Division Multiplexing (TDM) such as Optical Transport Network (OTN), etc. $LAYER_2$ can denote end network functionality such as vRAN (Virtualized Radio Access Network), vCN, packet networking, etc. Further, there can be resource assignments between the layers 204.

Comparison with the Traditional View of Virtual Network Embedding

Virtual network embedding is a well-known problem—given a demand profile for each virtual network and available shared resources, how does one assign the resources 110 to each virtual network and the typical approach involves topology creation using Steiner trees. However, there are problems with the assumptions in the virtual network embedding problem in that demands are not static, and networks are flexible enough to provide resources on demand.

The problem being addressed herein is assigning resources in a dynamic fashion. The initial resource assignment is not that important—the network 200 learns over time what the assignment should be by observing resources 110 and user behavior. The emphasis is on learning and continual improvement of how network resources are being used. The network 200 becomes self-programmable/self-driven/self-learning, i.e., autonomous or adaptive.

Resource Partitioning Example

Figure 4:
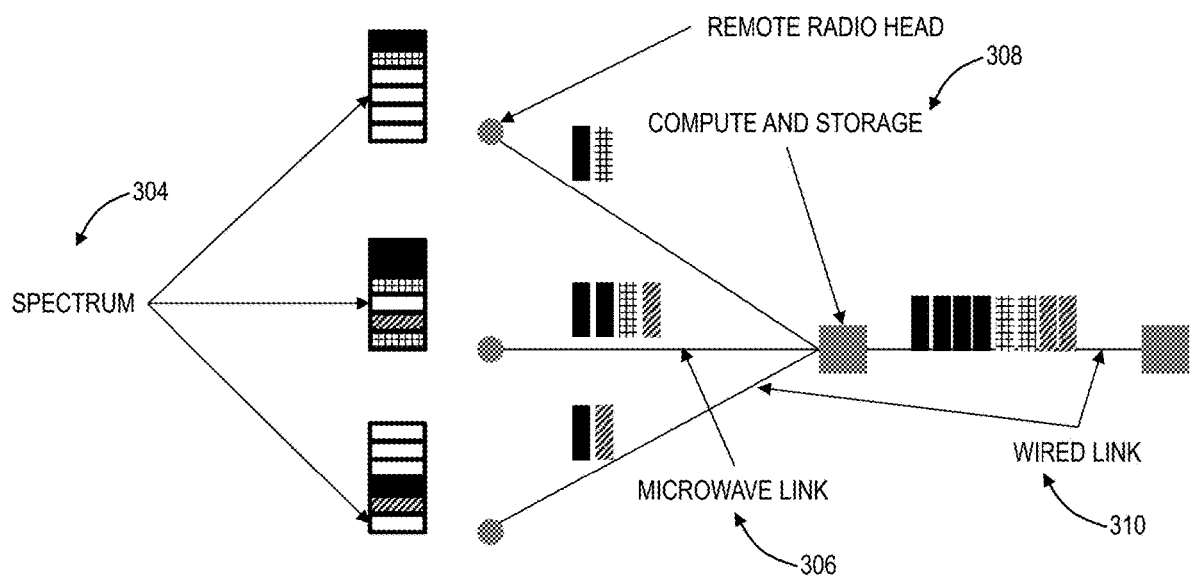
FIG. 4 is a network diagram illustrating a resource partitioning example for the vMNSP example.

FIG. 4 is a network diagram illustrating a resource partitioning example 300 for the vMNSP example. Here, there are three example partitions—112A, 112B, 112C. Each partition 112 is reserved a part of the available resources 110. A wireless service provider's network can include resources 110 of wireless spectrum 304, microwave links 306, compute and storage resources 308, wired links 310 for backhaul, etc. The radio resources for the spectrum 304 can be partitioned with Orthogonal Frequency-Division Multiple Access (OFDMA) resource blocks or areas of the spectrum. The network resources can be partitioned with Time Division Multiplexing (TDM) slots on a wired link 310 or peak-rate bandwidth allocation with Committed Information Rate (CIR) reservation at switches. The compute resources 308 can be partitioned with time slicing Central Processing Unit (CPU), virtual machine Random Access Memory (RAM) partitioning, etc. The storage resources 308 can be partitioned with caps on file disk usage, etc.

Network Resource Partitioning

For hard slicing, allocated network resources 110 can be guaranteed using Dense Wavelength Division Multiplexing (DWDM), TDM (e.g., Optical Transport Network (OTN) or Flexible Ethernet (FlexE)), or OFDMA (wireless), etc. Once allocated its bandwidth, a network 200 does not compete with other resource partitions 112 to use it with hard slicing.

For soft slicing, allocated network resources 110 can be guaranteed by ensuring aggregate CIR does not exceed available rate. QoS in a resource partition 112 is achieved with packet scheduling. The resource partition 112 can use whatever packet prioritization scheme it wishes to ensure QoS is met. The resource partition 112 can request additional bandwidth/spectrum to assure that QoS is met inside it. Since resources 110 have costs, the resource partition 112 can also decrease its resource usage when appropriate.

The resources 110 are dynamically shared among partitions 112. For example, OTN/FlexE may be requested/released using existing techniques in a Layer 1/Layer 2 (L2/L2) control plane or SDN controller. Also, DWDM resources (optical spectrum on fibers, optical power on fibers) may be requested/released using Layer 0 (L0) control plane or SDN controller. The resource partitions 112 do performance monitoring for flows under their management.

Compute resources may need always to be soft sliced, but peak rate allocations can be used to ensure QoS. Storage resources may be hard sliced with file system quotas. Memory (RAM) may be soft sliced or hard sliced with virtualization technologies. OFDMA resources may be requested/release using a RAN controller.

Virtual Resource Management

Figure 5:
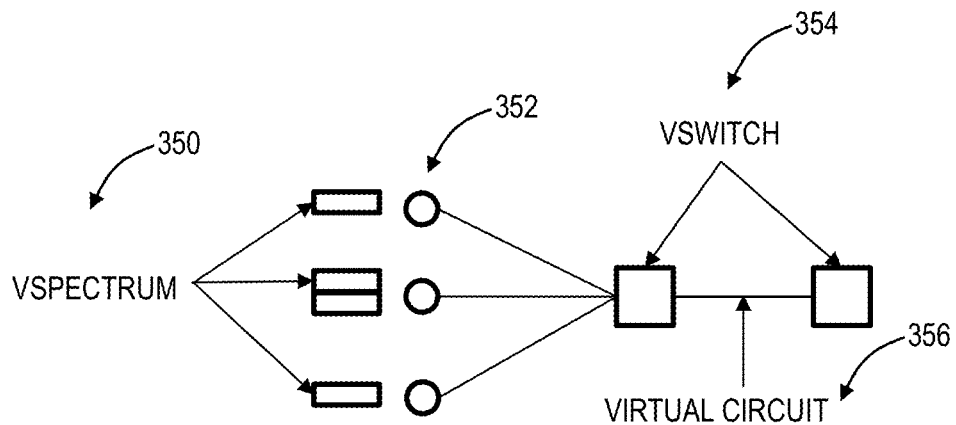
FIG. 5 is a network diagram of virtual resource management.
Figure 5:
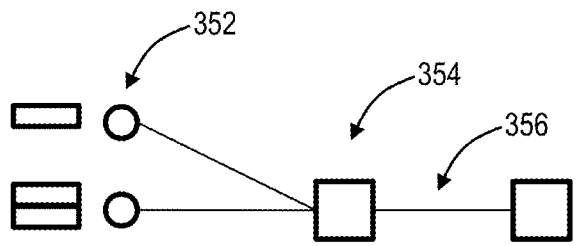
Figure 5:
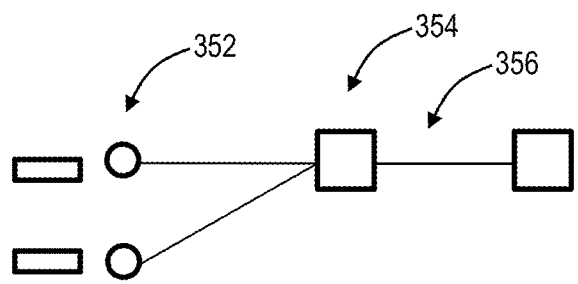

FIG. 5 is a network diagram of virtual resource management for the three example partitions 112A, 112B, 112C. The resource partition 112 manages its resources 110 including packet scheduling prioritization/traffic shaping, Virtualized Evolved Node B (V-eNB) scheduling, etc. For example, the resource partition 112A can include virtual spectrum 350, V-eNBs 352 which connects to vSwitches 354 which are connected via a virtual circuit 356. The resource partitions 112B, 112C can have the same or different components with different connectivity.

Partition Manager and Resource Broker

Figure 6:
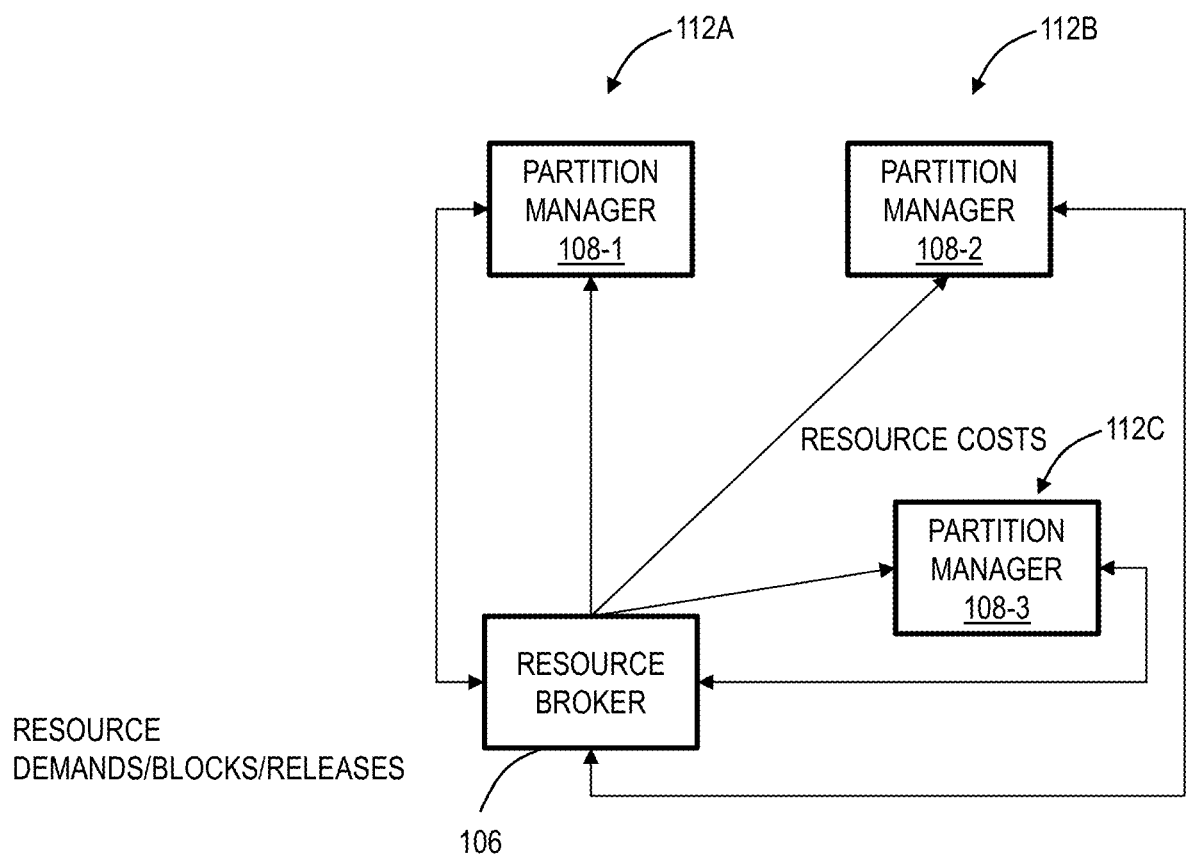
FIG. 6 is a network diagram of a network having partition managers and a network resource broker.

FIG. 6 is a network diagram of a network 400 having partition managers and a resource broker. FIG. 6 continues the example with three partitions 112A, 112B, 112C, each having its own resource manager 108-1, 108-2, 108-3 and a common resource broker 106. The resource broker 106 manages resources, keeps track of their use, and sets and broadcasts costs for resources. The partition manager 108-1, 108-2, 108-3 manages actual or virtual resources and requests resources from the resource broker 106 based on its need.

Figure 7:
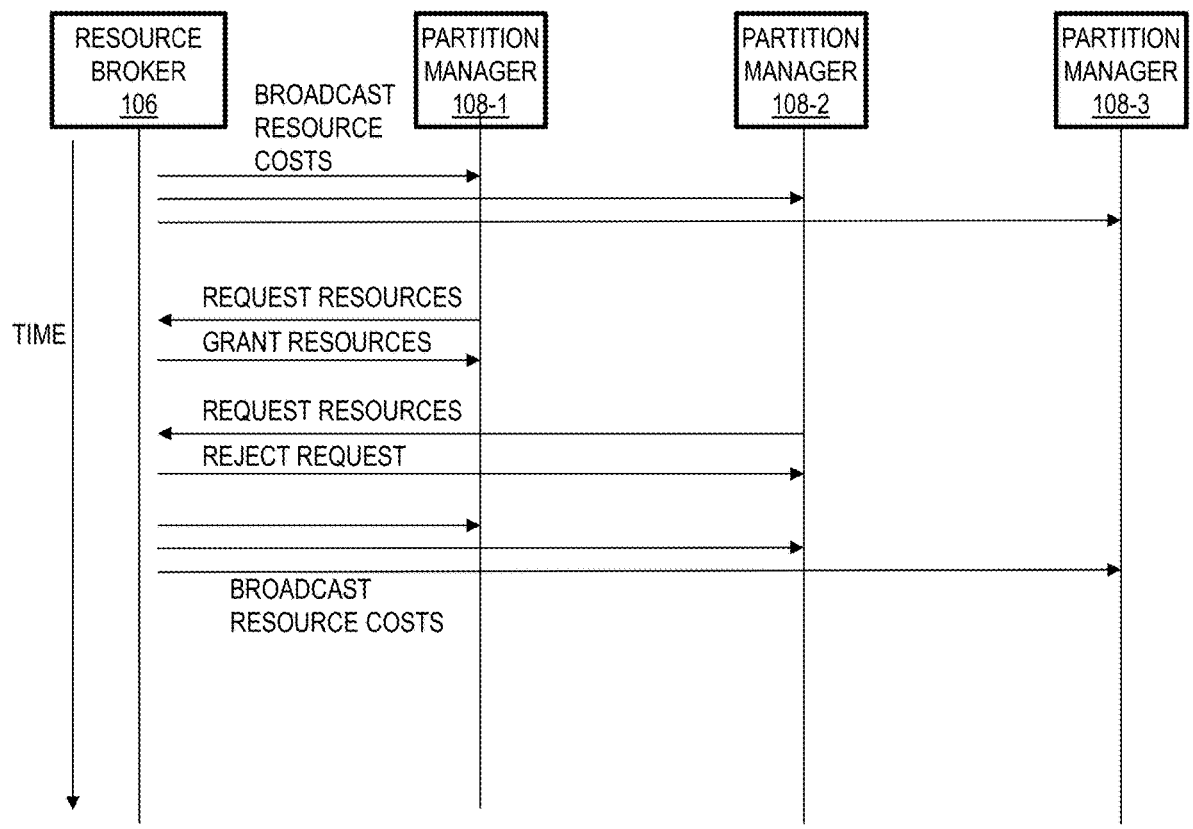
FIG. 7 is a diagram of an example of interaction over time between the resource partition managers and the network resource broker.

FIG. 7 is a diagram of an example of interaction over time between the partition managers 108-1, 108-2, 108-3 and the network resource broker 106. The resource broker 106 can periodically broadcast resource costs. The associated partition managers 108-1, 108-2, 108-3 can request resources 110 from the resource broker 106 over time, as needed, and based on the resource costs, and the resource broker 106 can grant/request the resources as well as update the resource costs. Also, as described herein, depending on the architecture, network type, etc., the resources 110 can be various different things in the network.

Figure 8:
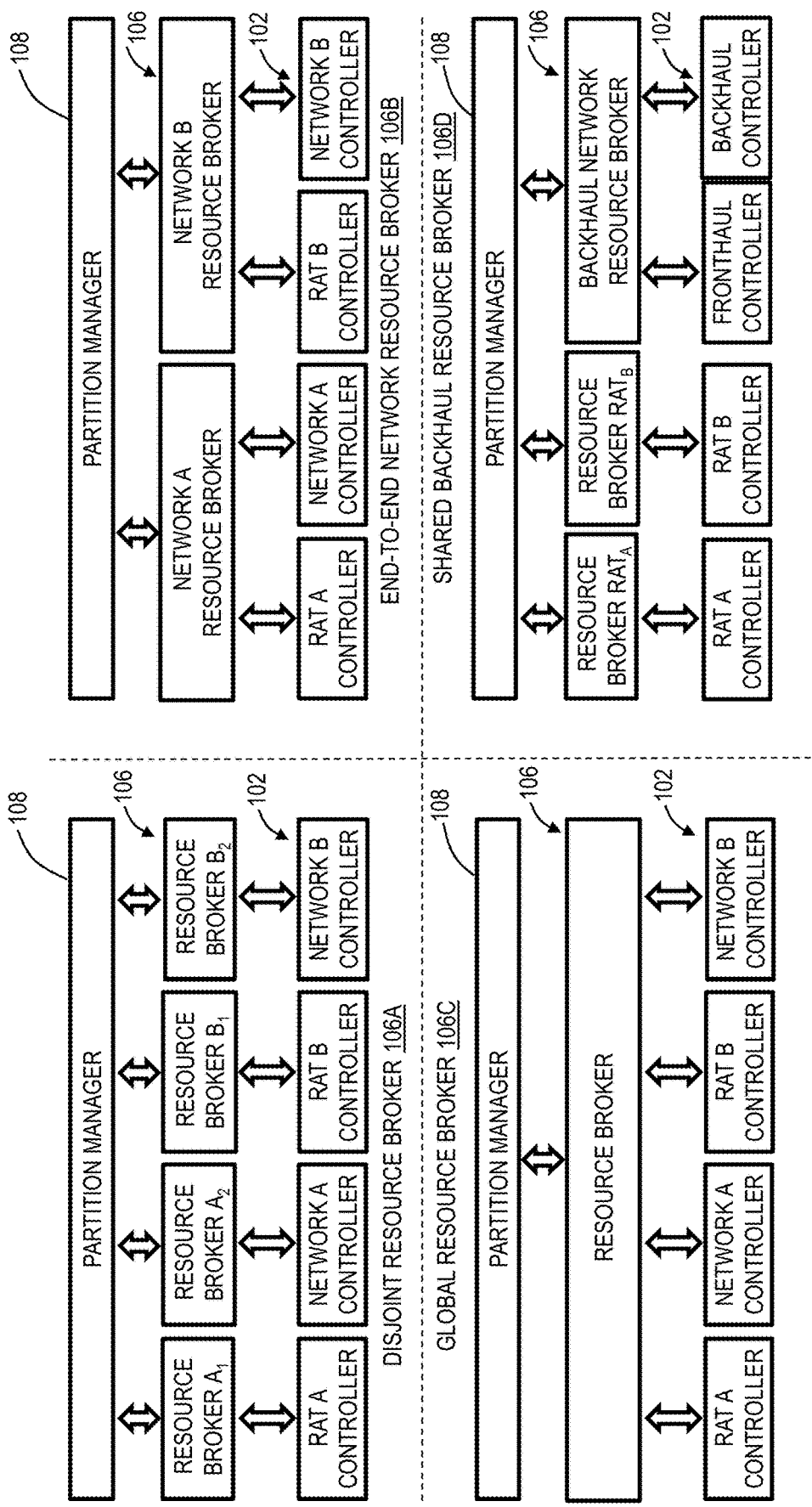
FIG. 8 is a block diagram of various architectural options for implementation of the network resource broker.

FIG. 8 is a block diagram of various architectural options for implementation of the resource broker 106 (labeled resource brokers 106A, 106B, 106C, 106D). For example, four approaches are illustrated including a disjoint resource broker 106A, an end-to-end resource broker 106B, a global resource broker 106C, and a shared backhaul resource broker 106D. Each of these examples includes a single partition manager 108 with different architectures for the resource brokers 106A, 106B, 106C, 106D.

The disjoint resource broker 106A includes a resource broker 106 for each resource controller 102 associated with the underlying resources 110. In this example, there is a resource broker $A_1$ 106 for a Radio Access Technology (RAT) A controller 102, a resource broker $A_2$ 106 for a network A controller 102, a resource broker $B_1$ 106 for a RAT B controller 102, and a resource broker $B_2$ 106 for a network B controller 102.

The end-to-end resource broker 106B includes sharing of the resource broker 106 for multiple resource controllers 102. For example, there can be two resource brokers 106 labeled as network A resource broker 106 and network B resource broker 106, each handling the corresponding resource controllers 102. The global resource broker 106C has a single resource broker 106 for all resource controllers 102. The shared backhaul resource broker 106D has a single resource broker 106 for backhaul and fronthaul related resource controllers 102. Of course, other embodiments are also contemplated.

Figure 9:
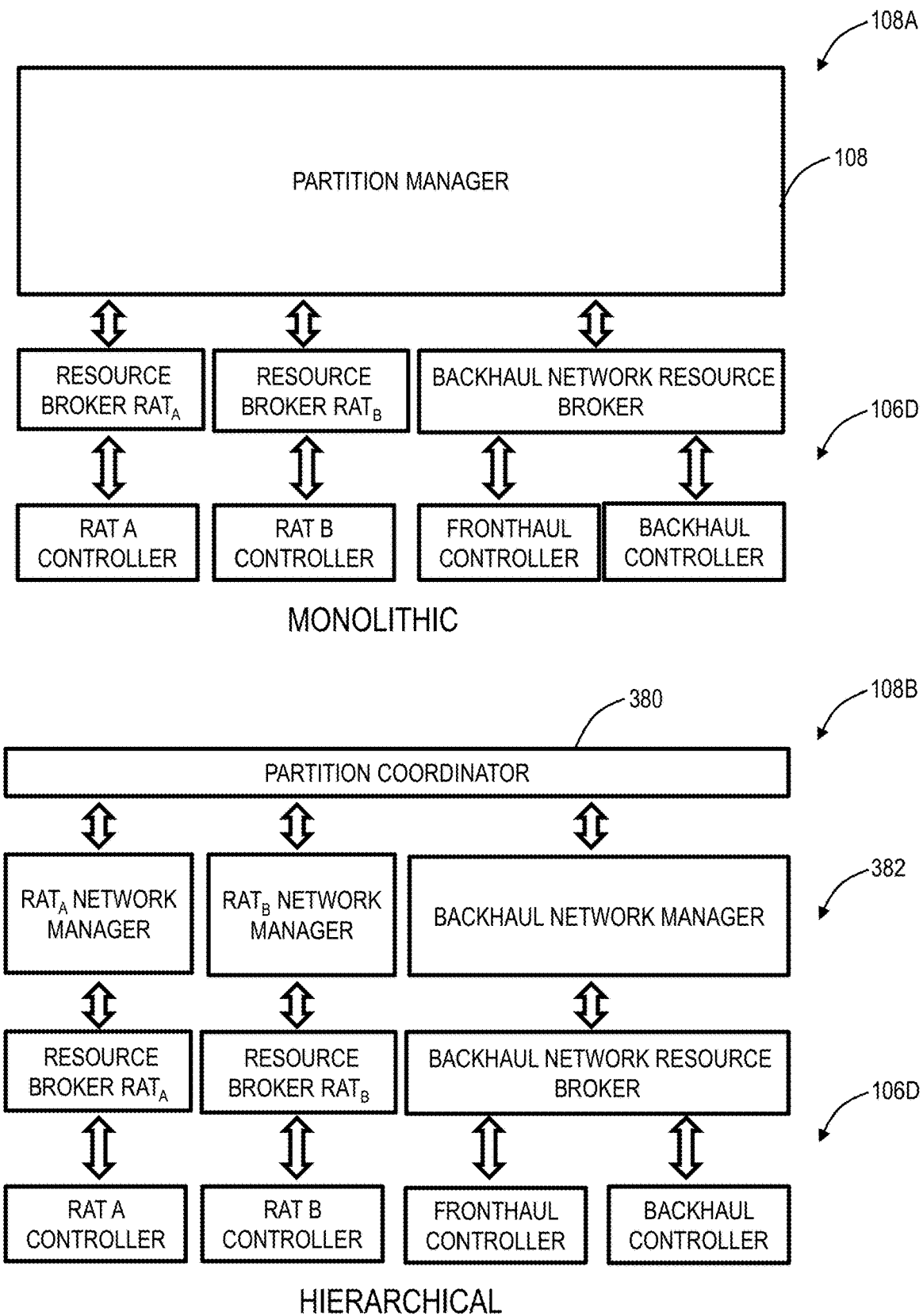
FIG. 9 is a block diagram of various architectural options for implementation of the resource partition manager.

FIG. 9 is a block diagram of various architectural options for implementation of the partition manager 108 (labeled as 108A, 108B). Each of the partition managers 108A, 108B is illustrated with the shared backhaul resource broker 106D. Of course, other embodiments are also contemplated. The partition manager 108A is referred to as a monolithic (single) partition manager 108 which communicates with the resource broker(s) 106. The partition manager 108B is referred to as a hierarchical partition manager which includes a partition coordinator 380 that communicates with Network Management Systems (NMS) 382 which communicate to the resource broker(s) 106.

Figure 10:
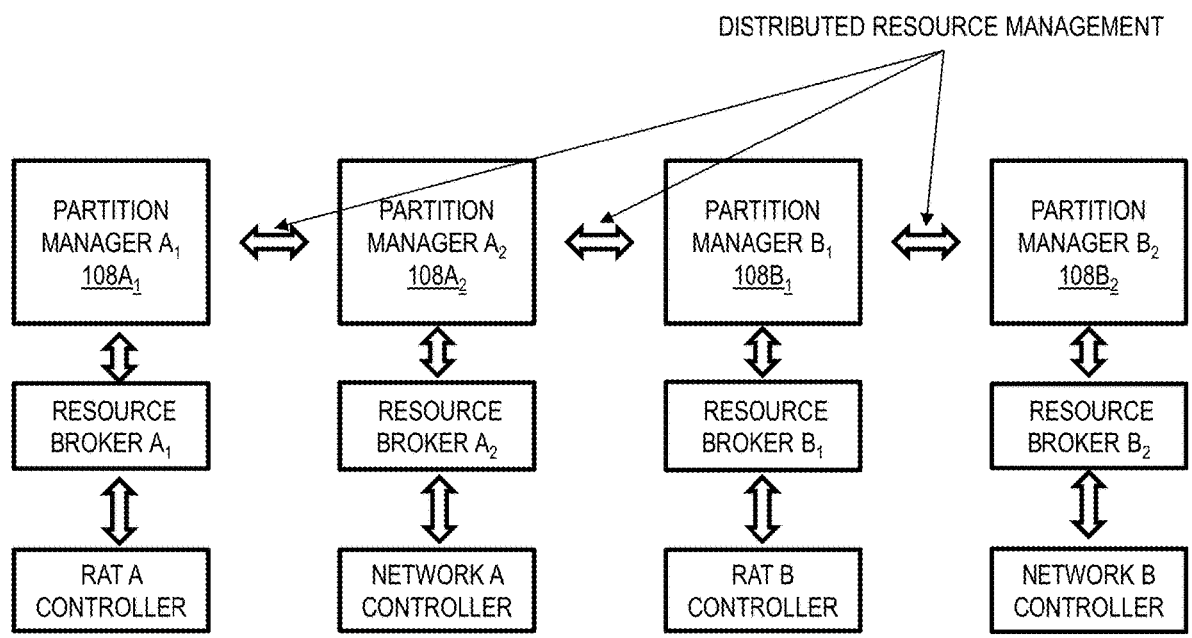
FIG. 10 is a block diagram of multiple resource partition managers for distributed resource management.

FIG. 10 is a block diagram of multiple partition managers 108 (labeled as partition managers $108A_1$, $108A_2$, $108B_1$, $108B_2$) for distributed resource management. Specifically, partition managers $108A_1$, $108A_2$, $108B_1$, $108B_2$ can coordinate with one another for resource management.

The resource broker 106 may reside on network elements (e.g. path computation element—PCE), NMSs, an orchestrator, or the like. For a network element, the resource broker 106 can be on an optical network element (such as a control plane module) or an Ethernet switch (such as an IEEE 802.1Qav compliant bridge). Here, the network resource broker 106 can be a disjoint resource broker such as to adjust optical rates, OTN slots, CIR, etc. The NMS can be a backhaul resource broker. The orchestrator can be NFV MANO and operate as a global resource broker.

The resource manager 104 may reside in a network element using the services of an underlying network resource 110: IP router on top of DWDM using GMPLS, vBBU in a BBU hotel, packet over optical (L1/L2) requesting resources from L1 control plane, a controller managing L2 equipment, where resource manager 104 may be in a micro-service requesting L0 resources from another micro-service, a micro-service, etc.

Either the resource broker 106 and the resource manager 104 may be implemented using an analytics platform and may reside on equipment at the customer premise, in the cloud owned by the customer or a third party, or the like.

Conventional Network Controller Versus the Resource Broker for Network Resources Conventional network controllers keep track of resources 110 and provision resources 110 to be used by specific traffic, which is associated with a network slice.

The network resource broker 106 described herein keeps track of resource assignment to network slices, assigns resources 110 to network slices, controls assignment of resources 110 based on availability, sets prices if pricing is used, etc.

It is expected for a network and controllers to evolve to support the systems and methods described herein. With respect to how the resource partition managers 108 manage resources, the systems and methods can utilize reinforcement learning such as to determine where to steer traffic, how to allocate radio spectrum resources, what packet scheduling discipline to use, etc.

The partition managers 108 are configured to determine which resources 110 to request should internal resources be insufficient to meet SLAs. These resources 110 and requests can include, for example, bandwidth increase/decreases, radio spectrum increases/decreases, compute increases/decreases, etc. The prices or time limits required on resources ensure that they are returned to the pool when no longer needed.

With respect to how the resource broker 106 controls resource usage, various goals can be set for the control, e.g., minimizing energy usage, reducing capital cost, etc. Prices and time limits can be set, etc.

Reinforcement Learning

Aspects of Reinforcement Learning for networks are described in U.S. patent application Ser. No. 16/185,471, filed Nov. 9, 2018, and entitled "REINFORCEMENT LEARNING FOR AUTONOMOUS TELECOMMUNICATIONS NETWORKS," the contents of which are incorporated by reference herein. Reinforcement learning (RL) is an area of machine learning inspired by behaviorist psychology, concerned with how software agents ought to take actions in an environment to maximize some notion of cumulative reward. In general, RL consists of any problem that seeks to learn what to do, i.e., an optimal mapping from its current state to some action, to maximize the received reward signal in the long-run. Often, an agent does not have any a priori knowledge of its environment and must discover which actions yield the most reward by trying them out. This leads to the trade-off between exploration and exploitation. The agent must exploit what it already knows to obtain rewards, but also needs to explore to make better actions in the future.

The approaches described herein are a new paradigm in configuring network applications. An operator only needs specify the cost (or reward) associated with particular network metrics or events, the list of actions allowed to be performed on the network, and the list of metrics to characterize the network state. For example, in a packet network, the costs and rewards may include −10 for dropping packets at strategic ports, −20 for a service to be on a secondary path, and +10 for keeping a service latency below some Service Layer Agreement (SLA) value. The allowed actions may include: doing nothing, adjusting the bandwidth allocated to a service, or re-routing a service to a secondary path. The metrics describing the network state may include the transmitted and received bytes at various ports, the latency of each service and the date and time of day.

Of note, the operator does not need to determine the optimal settings of the network parameters and does not need to implement if { . . . } else { . . . } rules to control the network actions. These are learned automatically by the application, which simplifies network operations significantly. To influence the network settings manually, the operator can modify the RL cost function at any point in time, which will result in the network converging to a new optimal state. For instance, the operator may decide to raise the cost of dropping packets from high-priority services or to decrease the cost of being on a secondary path during certain times of the day.

In another embodiment, the RL packet-optical application can be capable of learning when/how to adjust bandwidth profiles and when/how to re-route services of high and low priority in a packet network, in the presence of varying traffic patterns, using RL. For example, the costs can be −10 for dropping packets on low-priority service, −20 for dropping packets on high-priority service, and −10 for any service to be on the secondary path. The actions can be, for each service, do nothing, set bandwidth to 1G, 4G, 10G, or some other value, or re-route to (pre-defined) primary or secondary path. The state can be the received (Rx) bytes of each service at strategic ports and the current path of each service.

In an embodiment, the optimal policies defining what actions to take for each state can be learned offline (e.g., through simulated data, through historical data, or a combination thereof). This can include developing a state-transition probability matrix (s, s'), and then applied online on a live network.

Again, FIG. 2 is a block diagram of the relationship between the resource partition manager 108 and the network resource broker 106 using RL. The system observes network state and tracks network load and produces the best network controller policy based on its prediction of network load and its knowledge of network state.

In RL there are two parts of an action —(1) the RL policy which is the probability of taking action in a given state and (2) the actual action. The systems and methods go beyond the classical version of RL and use (1) or (2) depending on the use case. For the resource manager 104, the action is one of (a) request more of a resource (or group of resources) or (b) release some of the resource (or group of resources). This fits (2). For the resource broker 106, the action set could either be discretized with (a) raise price and (b) decrease price of a resource using classical approach of (2), or the price could be the continuously taken from the RL policy and directly applied to the resources, which is a more advanced application or RL than typically seen in literature by using (1) directly and essentially forgoing (2).

Partition Manager Process to Request Resource

Figure 11:
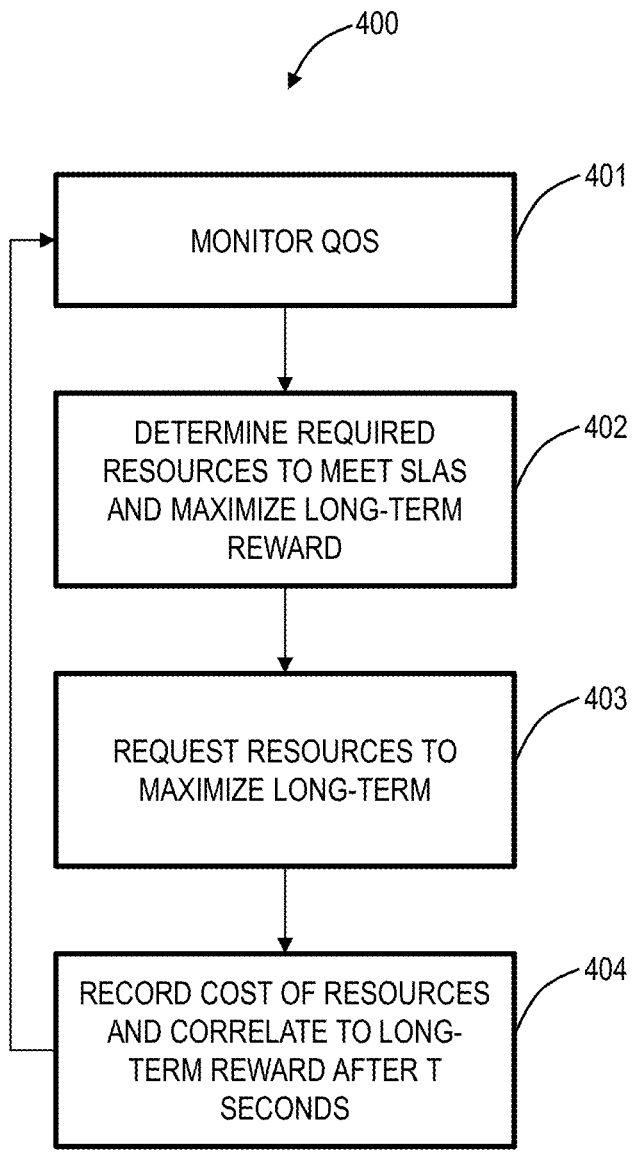
FIG. 11 is a flowchart of a process implemented by the resource partition manager to request resources.

FIG. 11 is a flowchart of a process 400 implemented by the partition manager 108 to request resources 110. The partition manager 108 can use reinforcement learning to determine where to request additional resources 110. The QoS is monitored by observing network performance end-to-end and on links (step 401). The required resources are determined to meet SLAs and/or maximize some objective such as a long-term reward in RL (step 402). The determined resources are requested such as to maximize the long-term reward (step 403), and the cost of the requested resources is recorded and correlated to the long-term reward after some time period (e.g., T seconds) (step 404).

The end-to-end performance may be latency, packet loss, estimated throughput, service curve, etc. The link performance may be: hop-by-hop latency, queue sizes, dropped packets, an observed rate exceeding allocated rate (by observing packet discarding), etc. The reward for reinforcement learning is determined by calculating long-term network cost (e.g., cost of resources+ cost of not meeting SLAs).

The infrastructure monetary cost ($C_1$) of the network is what the vMNSP is paying to use its actual resources or the cost of a virtual network using virtual resources. This cost can be tracked and charged to the end business by keeping track of the resources used. The cost of not meeting SLAs ($C_{SLA}$) can be contractually specified between the clients of the vMNSP and is money returned back to the clients, or if there is no contract, it is a virtual cost used by the vMNSP to keep track of SLAs violations. The vMNSP can track the cost of meeting SLAs. Time may be split into slots and the cost of each time slot is the weighted sum of the two costs above, and the costs are added together to get $C(T)=C_1(T)+C_{SLA}(T)$ where $C(T)$=the cost of slot T. The reward of the system is the discounted cost time at T using k historical slots obtained with $R(T)=C(T)+\Sigma_k \varphi^k C(T-k)$. The system is striving to optimize the network and maximizing $R(T)$ at each T.

Actions are for each resource and may include increase/decrease resource by 1 unit or k units. The resources may be actual resources or virtual resources. Actual resources may be increased by increasing wireless spectrum in terms of additional RBs, the optical rate in terms of higher modulation rate Gbps, the extra spectrum on fiber in terms of fixed-grid channels or contiguous spectrum for flex-grid channels, higher packet rate in terms of higher CIR, etc. Resources are released by decreasing the above quantities.

Figure 12:
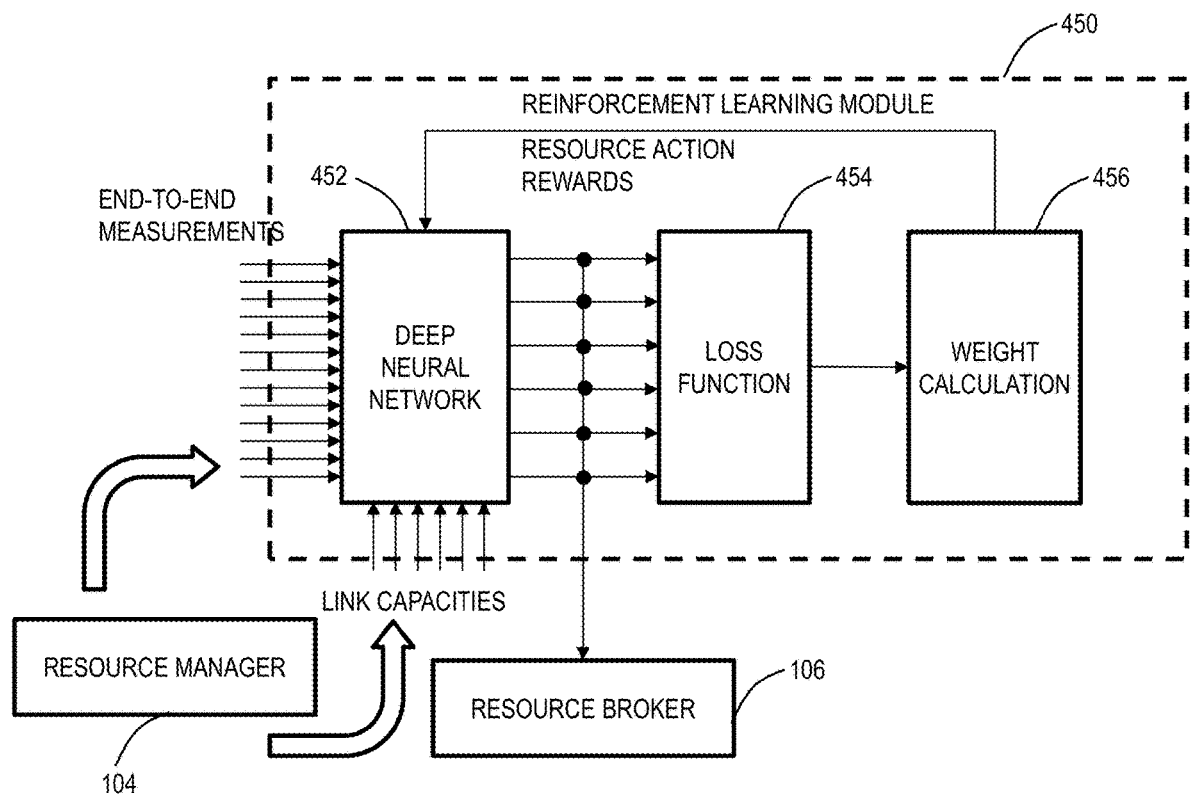
FIG. 12 is a block diagram of reinforcement learning for requesting resources.

FIG. 12 is a block diagram of a reinforcement learning module 450 for requesting resources. The resource manager 104 is configured to feed end-to-end measurements and resource capabilities in a Deep Neural Network (DNN) module 452. A Deep Neural Network (DNN) is an Artificial Neural Network (ANN) with multiple hidden layers between the input and output layers. An ANN is based on a collection of connected units called artificial neurons, (analogous to axons in a biological brain). Each connection (synapse) between neurons can transmit a signal to another neuron. The receiving (postsynaptic) neuron can process the signal(s) and then signal downstream neurons connected to it. Neurons may have a state, generally represented by real numbers, typically between 0 and 1. Neurons and synapses may also have a weight that varies as learning proceeds, which can increase or decrease the strength of the signal that it sends downstream. Typically, neurons are organized in layers. Different layers may perform different kinds of transformations on their inputs. Signals travel from the first (input) to the last (output) layer, possibly after traversing the layers multiple times. Similar to shallow ANNs, DNNs can model complex non-linear relationships. DNN architectures generate compositional models where the object is expressed as a layered composition of primitives. The extra layers enable composition of features from lower layers, potentially modeling complex data with fewer units than a similarly performing shallow network.

The DNN module 452 provides outputs to the resource broker 106 for resource action rewards and to a loss function 454 which provides a weight 456 which can be calculated using a stochastic gradient with backpropagation.

Resource Broker Process to Determine Prices for Resources

Figure 13:
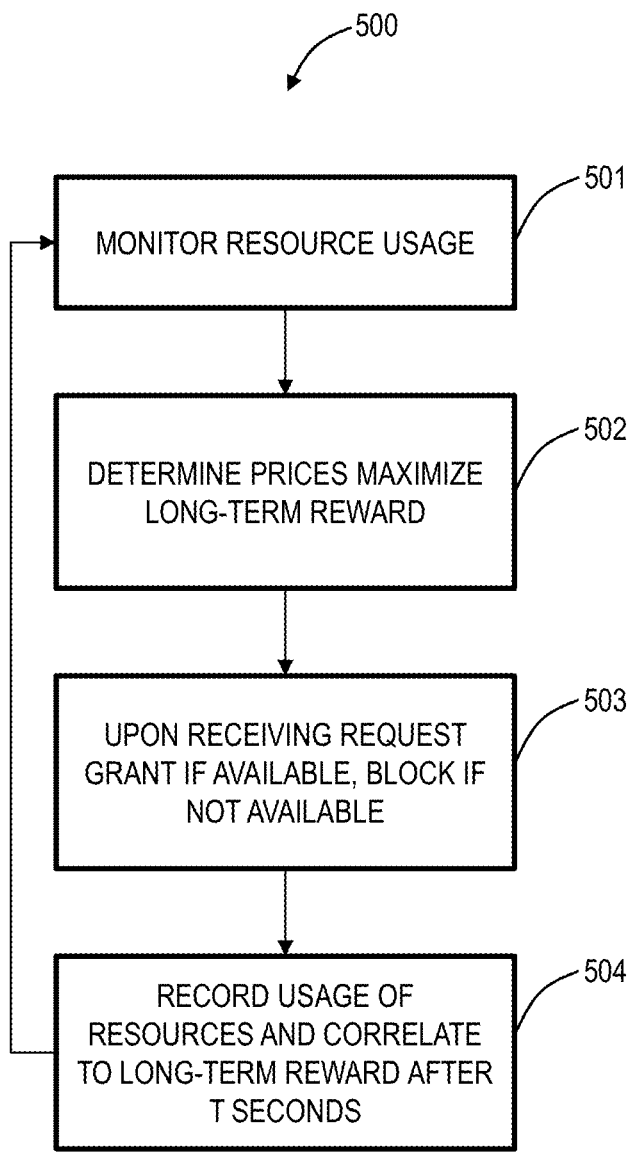
FIG. 13 is a flowchart of a process implemented by the resource broker to determine prices for resources.

FIG. 13 is a flowchart of a process 500 implemented by the resource broker 106 to determine prices for resources 110. The resource broker 106 can use reinforcement learning to determine how to price resources 110. Resource 110 usage is monitored (step 501) and prices can be determined to maximize some objective such as a long-term reward (step 502). Responsive to the resource broker 106 receiving a request for resources 110, the request is granted if the resources are available or blocked if the resources are not available (step 503). The usage of resources is recorded and correlated to the objective or long-term reward after a time period such as T seconds (step 504).

The reward for reinforcement learning is determined by calculating long-term network profit: revenue from resource usage—the cost of running resources 110. The cost of running resources can be energy use, license costs for virtual resources, costs for physical resources, etc. These costs can be tracked by an outside system such as a network OSS. The revenue is obtained from resource usage and is tracked by an outside system such as the OSS.

The reward can be calculated as revenue minus cost, namely $R(T)=\text{Revenue}(T)-\text{Cost}(T)$ where $R(T)$ is the reward for each time slot T. The expected reward is calculated using discounting (as described above). The rewards can be structured to maximize the long-term efficiency of the network. The prices can set to encourage usage if usage is going low (decrease prices), or to shift resource usage to underutilized parts of the network (lower prices on mid-utilized links, and decrease prices on low-utilized links), etc. The output of reinforcement learning is the cost of resources. Alternative techniques to pricing resources include fixed prices and classes of prices and put limit how much of each class is available (See commonly-assigned U.S. Pat. No. 9,838,271, issued Dec. 5, 2017, and entitled "NETWORK SERVICE PRICING AND RESOURCE MANAGEMENT IN A SOFTWARE DEFINED NETWORKING ENVIRONMENT," the contents of which are incorporated by reference herein).

Server

Figure 14:
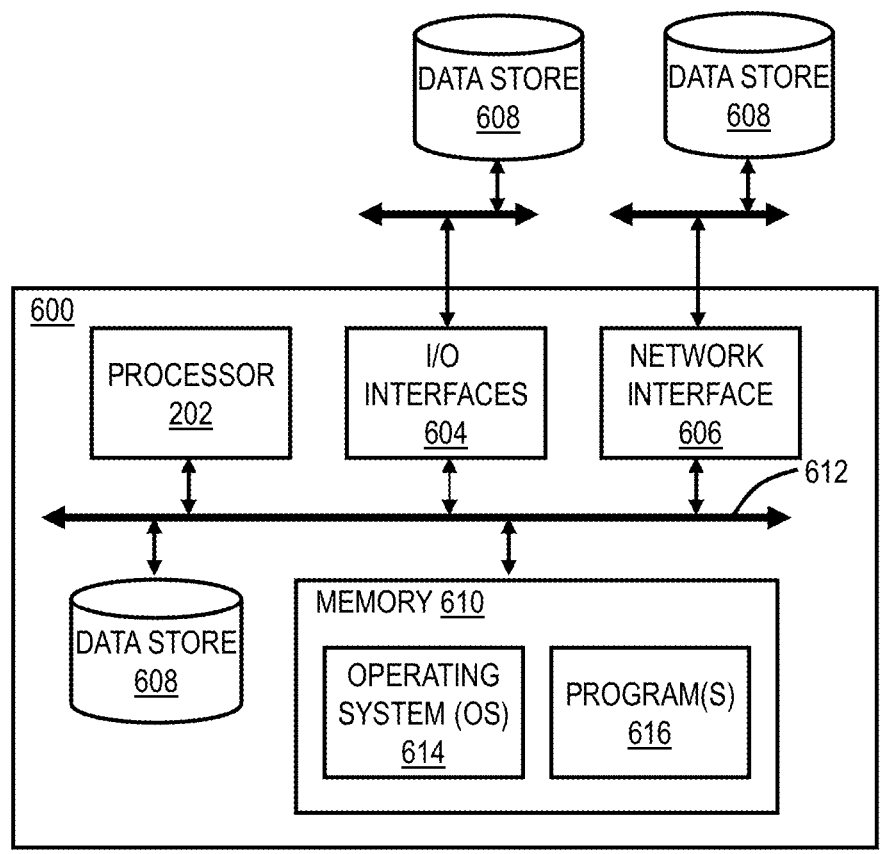
FIG. 14 is a block diagram of a server which may be used for various devices described herein.

FIG. 14 is a block diagram of a processing device 600 which may be used for various devices described herein. For example, the partition manager 108, the resource broker 106, etc. contemplate implementation through one or more processing devices 600.

The processing device 600 may be a digital computer that, in terms of hardware architecture, generally includes a processor 602, input/output (I/O) interfaces 604, a network interface 606, a data store 608, and memory 610. It should be appreciated by those of ordinary skill in the art that FIG. 14 depicts the processing device 600 in an oversimplified manner, and a practical embodiment may include additional components and suitably configured processing logic to support known or conventional operating features that are not described in detail herein. The components (602, 604, 606, 608, and 610) are communicatively coupled via a local interface 612. The local interface 612 may be, for example, but not limited to, one or more buses or other wired or wireless connections, as is known in the art. The local interface 612 may have additional elements, which are omitted for simplicity, such as controllers, buffers (caches), drivers, repeaters, and receivers, among many others, to enable communications. Further, the local interface 612 may include address, control, and/or data connections to enable appropriate communications among the aforementioned components.

The processor 602 is a hardware device for executing software instructions. The processor 602 may be any custom made or commercially available processor, a central processing unit (CPU), an auxiliary processor among several processors associated with the processing device 600, a semiconductor-based microprocessor (in the form of a microchip or chip set), or generally any device for executing software instructions. When the processing device 600 is in operation, the processor 602 is configured to execute software stored within the memory 610, to communicate data to and from the memory 610, and to generally control operations of the processing device 600 pursuant to the software instructions. The I/O interfaces 604 may be used to receive user input from and/or for providing system output to one or more devices or components. User input may be provided via, for example, a keyboard, touchpad, and/or a mouse. System output may be provided via a display device and a printer (not shown). I/O interfaces 204 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 606 may be used to enable the processing device 600 to communicate on a network, such as the to network elements, NMSs, SDN controllers, to various devices described herein, etc. The network interface 606 may include, for example, an Ethernet card or adapter (e.g., 10 BaseT, Fast Ethernet, Gigabit Ethernet, 10 GbE) or a wireless local area network (WLAN) card or adapter (e.g., 802.11a/b/g/n/ac). The network interface 606 may include address, control, and/or data connections to enable appropriate communications on the network. A data store 608 may be used to store data. The data store 608 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 608 may incorporate electronic, magnetic, optical, and/or other types of storage media. In one example, the data store 608 may be located internal to the processing device 600 such as, for example, an internal hard drive connected to the local interface 612 in the processing device 600. Additionally, in another embodiment, the data store 608 may be located external to the processing device 600 such as, for example, an external hard drive connected to the I/O interfaces 204 (e.g., SCSI or USB connection). In a further embodiment, the data store 608 may be connected to the processing device 600 through a network, such as, for example, a network attached file server.

The memory 610 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 610 may incorporate electronic, magnetic, optical, and/or other types of storage media. Note that the memory 610 may have a distributed architecture, where various components are situated remotely from one another but can be accessed by the processor 602. The software in memory 610 may include one or more software programs, each of which includes an ordered listing of executable instructions for implementing logical functions. The software in the memory 610 includes a suitable operating system (O/S) 614 and one or more programs 616. The operating system 614 essentially controls the execution of other computer programs, such as the one or more programs 616, and provides scheduling, input-output control, file and data management, memory management, and communication control and related services. The one or more programs 616 may be configured to implement the various processes, algorithms, methods, techniques, etc. described herein.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A system for autonomic resource partitioning in a network, the system comprising:
one or more processors; and
memory storing instructions that, when executed cause the processor to implement building blocks of layered virtual functionality including:
a resource controller configured to provision a plurality of resources including any of virtual resources and physical resources in one or more layers in the network and monitor availability of the plurality of resources in the network;
a resource manager configured to determine which of the plurality of resources are required for Quality of Service (QoS) in the network and to satisfy the QoS required recursively using resources of the plurality of resources provided by a layer below the resource manager and resources of the plurality of resources provided at the layer of the resource manager requested by a partition manager;
a resource broker configured to advertise and assign resource requests to corresponding resources recursively to resource partitions in a layer above the resource broker; and
the partition manager configured to track the utilization of the resources provided by the one or more layers and to adjust resource usage of the resources in negotiation with the resource broker to minimize a cost of implementation, wherein one or more of the partition manager and the resource broker utilize a deep-Q network (DQN) in the negotiation that includes reinforcement learning and deep neural netwroks, wherein an operator specifies rewards and network costs to converge the plurality of resources in the network to a desired state.

2. The system of claim 1, wherein the partition manager receives resource partition state information and provides resource adjustment information to the resource broker, and wherein the resource broker provides resource costs to the partition manager and commands for resource adjustments to the resource controller.

3. The system of claim 1, wherein the resources are a combination of compute, storage, wired connectivity resources and wireless connectivity resources.

4. The system of claim 1, wherein the virtual resources include dynamic compositions of chained Virtual Network Functions (VNFs), and wherein the physical resources include any of hard slices and soft slices of the network.

5. The system of claim 1, wherein the resource broker utilizes pricing on resource usage to ensure the partition manager gives up corresponding resources when they are not needed in a partition managed by the partition manager.

6. The system of claim 1, wherein the partition manager is configured to
monitor Quality of Service (QoS) in the network,
determine required resources in the network to meet Service Layer Agreements (SLAs) and to maximize long-term rewards,
one or more of request and release corresponding resources in the network to maximize the long-term rewards, and
determine costs of the resources and correlate the costs to the long-term rewards.

7. The system of claim 6, wherein the long-term rewards are determined by calculating long-term network cost which includes a cost of resources plus a cost of not meeting Service Layer Agreements (SLAs).

8. The system of claim 1, wherein the resource broker is configured to monitor resource usage in the network,
determine prices of resources in the network based on the resource usage and to maximize long-term rewards,
receive a request for associated resources and grant the request if the resources are available and block the resources if unavailable, and
determine costs of the resources and correlate the costs to the long-term rewards.

9. The system of claim 8, wherein the long-term rewards are calculated as revenue minus cost, namely $R(T)$=Revenue$(T) - $Cost$(T)$ where $R(T)$ is the reward for each time slot T.

10. A method for autonomous resource partitioning in a network, the method comprising:
provisioning a plurality of resources including any of virtual resources and physical resources in one or more layers in the network and monitoring availability of the plurality of resources in the network;
determining which of the plurality of resources are required for Quality of Service (QoS) in the network and satisfying the QoS required recursively using resources of the plurality of resources provided by a layer below and resources of the plurality of resources provided at a layer thereof requested by a partition manager;
advertising and assigning resource requests to corresponding resources recursively to resource partitions in a layer above; and
tracking the utilization of the resources provided by the one or more layers and adjusting resource usage of the resources based on a negotiation to minimize a cost of implementation wherein one or more of the partition manager and the resource broker utilize a deep-Q network (DQN) in the negotiation that includes reinforcement learning and deep neural netwroks, wherein an operator specifies rewards and network costs to converge the plurality of resources in the network to a desired state.

11. The method of claim 10, wherein the provisioning and the monitoring is performed by a resource controller, the determining is performed by a resource manager, the advertising and the assigning is performed by the resource broker, and the tracking is performed by the partition manager.

12. The method of claim 11, wherein the partition manager receives resource partition state information and provides resource adjustment information to the resource broker, and wherein the resource broker provides resource costs to the partition manager and commands for resource adjustments to the resource controller.

13. The method of claim 10, wherein the resources are a combination of compute, storage, wired connectivity resources and wireless connectivity resources.

14. The method of claim 10, wherein the virtual resources include dynamic compositions of Virtual Network Functions (VNFs), and wherein the physical resources include any of hard slices and soft slices of the network.

15. The method of claim 10, further comprising
monitoring Quality of Service (QoS) in the network;
determining required resources in the network to meet Service Layer Agreements (SLAs) and to maximize long-term rewards;
one or more of requesting and releasing corresponding resources in the network to maximize the long-term rewards; and
determining costs of the resources and correlate the costs to the long-term rewards.

16. The method of claim 10, further comprising
monitoring resource usage in the network;
determining prices of resources in the network based on the resource usage and to maximize long-term rewards;
receiving a request for associated resources and granting the request if the resources are available and blocking the resources if unavailable; and
determining costs of the resources and correlating the costs to the long-term rewards.

17. A reinforcement learning system for autonomous resource partitioning in a network, the reinforcement learning system comprising:
one or more processors; and
memory storing instructions that, when executed cause the processor to implement building blocks of layered virtual functionality including:
a resource controller configured to provision a plurality of resources including any of virtual resources and physical resources in one or more layers in the network and monitor availability of the plurality of resources in the network;
a resource broker configured to advertise and assign resource requests to corresponding resources of the plurality of resources recursively to resource partitions in a layer above the resource broker; and
a partition manager configured to track the utilization of the resources provided by the one or more layers and to adjust resource usage of the resources in negotiation with the resource broker to minimize a cost of implementation,
wherein one or more of the partition manager and the resource broker utilize a deep-Q network (DQN) in the negotiation that includes reinforcement learning in the negotiation that includes reinforcement learning and deep neural networks, wherein an operator specifies rewards and network costs to converge the plurality of resources in the network to a desired state, wherein the partition manager receives resource partition state information and provides resource adjustment information to the resource broker, and wherein the resource broker provides resource costs to the partition manager and commands for resource adjustments to the resource controller.

18. The reinforcement learning system of claim 17, wherein the one or more of the partition manager and the resource broker utilize deep-Q network (DQN) reinforcement learning.

19. The reinforcement learning system of claim 17, wherein the resources are a combination of compute, storage, wired connectivity resources and wireless connectivity resources.

* * * * *